United States Patent
Matsushita et al.

(10) Patent No.: US 9,542,497 B2
(45) Date of Patent: Jan. 10, 2017

(54) INFORMATION PROCESSING APPARATUS, INFORMATION PROCESSING METHOD, AND INFORMATION PROCESSING PROGRAM

(71) Applicant: JVC KENWOOD Corporation, Yokohama-shi, Kanagawa (JP)

(72) Inventors: Konosuke Matsushita, Kawasaki (JP); Ichiro Shishido, Zushi (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 182 days.

(21) Appl. No.: 14/313,115

(22) Filed: Jun. 24, 2014

(65) Prior Publication Data
US 2015/0006527 A1  Jan. 1, 2015

(30) Foreign Application Priority Data
Jun. 28, 2013  (JP) ................................ 2013-136121

(51) Int. Cl.
*G06F 17/30* (2006.01)

(52) U.S. Cl.
CPC ... *G06F 17/30867* (2013.01); *G06F 17/30761* (2013.01)

(58) Field of Classification Search
CPC ............... G06F 17/30867; G06F 17/30761
USPC .............. 707/728, 748, 749, 751, 727
See application file for complete search history.

(56) References Cited

U.S. PATENT DOCUMENTS

| 6,330,554 B1 * | 12/2001 | Altschuler | G06Q 30/02 706/21 |
| 2003/0014421 A1 * | 1/2003 | Jung | G06F 17/30917 707/999.102 |
| 2013/0080641 A1 * | 3/2013 | Lui | G06F 9/505 709/226 |

FOREIGN PATENT DOCUMENTS

JP 2012-059183 A 3/2012

* cited by examiner

Primary Examiner — Vincent Boccio
(74) Attorney, Agent, or Firm — Nath, Goldberg & Meyer; Jerald L. Meyer; Stanley N. Protigal

(57) ABSTRACT

A usage information storage section is configured to store usage information. An item information storage section is configured to store attribute correspondence information. A relevant attribute selection section is configured to calculate an attribute relevant degree based on the usage information and the attribute correspondence information, select a relevant attribute for each item identifier based on the calculated attribute relevant degree, and create relevant attribute information in which each item identifier and the selected relevant attribute are associated with each other. A relevant item selection section is configured to acquire attribute correspondence information including any attribute identifier included in the relevant attribute information, calculate a relevant degree between each item identifier included in a relevant candidate item aggregate as an aggregate of item identifiers included in the acquired attribute correspondence information and a reference item, and select an item relevant to the reference item based on the calculated relevant degree.

9 Claims, 13 Drawing Sheets

FIG. 3

USER INFORMATION

USER IDENTIFIER   USER ATTRIBUTE INFORMATION

| user_id | user_info |
|---------|-----------|
| u1 | USER NAME: JANE DOE<br>GENDER: FEMALE<br>AGE: 22<br>ADDRESS: TOKYO<br>DATE ADMITTED: NOV. 29, 2006 |
| ⋮ | ⋮ |

FIG. 4A

ITEM IDENTIFICATION INFORMATION

ITEM IDENTIFIER   NAME OF ITEM

| item_id | item_name |
|---------|-----------|
| i1      | BOOK C    |
| i2      | NOVEL A   |
| ⋮       | ⋮         |

FIG. 4B

ATTRIBUTE TYPE INFORMATION

ATTRIBUTE TYPE IDENTIFIER   NAME OF TYPE OF ITEM ATTRIBUTE

| type_id | type_name    |
|---------|--------------|
| ta      | IMPLEMENTER  |
| tb      | CATEGORY     |
| ⋮       | ⋮            |

FIG. 4C

ATTRIBUTE VALUE INFORMATION

ATTRIBUTE IDENTIFIER

ATTRIBUTE TYPE IDENTIFIER   ATTRIBUTE VALUE IDENTIFIER   ATTRIBUTE VALUE

| type_id | attr_id | attr_name |
|---------|---------|-----------|
| ta      | ta1     | AUTHOR A  |
| tb      | ta2     | AUTHOR B  |
| ⋮       | ⋮       | ⋮         |
| tb      | tb1     | FICTION   |
| tb      | tb2     | COOKING   |
| ⋮       | ⋮       | ⋮         |

FIG. 4D

ATTRIBUTE CORRESPONDENCE INFORMATION

ATTRIBUTE IDENTIFIER

ITEM IDENTIFIER   ATTRIBUTE TYPE IDENTIFIER   ATTRIBUTE VALUE IDENTIFIER

| item_id | type_id | attr_id |
|---------|---------|---------|
| i1      | ta      | ta1     |
| i1      | tb      | tb1     |
| ⋮       | ⋮       | ⋮       |
| i2      | ta      | ta2     |
| i2      | tb      | tb4     |
| ⋮       | ⋮       | ⋮       |

FIG. 5

USAGE INFORMATION

USER IDENTIFIER / ITEM IDENTIFIER / USAGE DATE/TIME INFORMATION

| user_id | item_id | dl_date |
|---------|---------|---------------|
| u1 | i3 | AUG. 16, 2008 |
| u1 | i23 | MAR. 12, 2009 |
| ⋮ | ⋮ | ⋮ |
| u2 | i4 | NOV. 16, 2008 |
| u2 | i17 | NOV. 29, 2007 |
| ⋮ | ⋮ | ⋮ |

FIG. 6

RELEVANT ATTRIBUTE INFORMATION

ATTRIBUTE IDENTIFIER

ITEM IDENTIFIER | ATTRIBUTE TYPE IDENTIFIER | ATTRIBUTE VALUE IDENTIFIER | ATTRIBUTE RELEVANT DEGREE

| item_id | type_id | attr_id | a_value |
|---------|---------|---------|---------|
| i1 | ta | ta4 | 0.38 |
| i1 | ta | ta7 | 1.29 |
| ⋮ | ⋮ | ⋮ | ⋮ |
| i2 | ta | ta6 | 3.98 |
| i2 | tb | tb3 | 1.36 |
| ⋮ | ⋮ | ⋮ | ⋮ |

FIG. 7

ATTRIBUTE PRIORITY VALUE INFORMATION

ATTRIBUTE IDENTIFIER

ITEM IDENTIFIER | ATTRIBUTE TYPE IDENTIFIER | ATTRIBUTE VALUE IDENTIFIER | ATTRIBUTE PRIORITY VALUE

| item_id | type_id | attr_id | p_value |
|---------|---------|---------|---------|
| i1 | ta | ta1 | 2.98 |
| i1 | tb | tb1 | 1.29 |
| ⋮ | ⋮ | ⋮ | ⋮ |
| i2 | ta | ta2 | 1.54 |
| i2 | tb | tb4 | 3.31 |
| ⋮ | ⋮ | ⋮ | ⋮ |

FIG. 8

RELEVANT ITEM INFORMATION

| base_item_id (REFERENCE ITEM IDENTIFIER) | sim_item_id (RELEVANT ITEM IDENTIFIER) | s_value (RELEVANT DEGREE) |
|---|---|---|
| i1 | i4 | 325 |
| i1 | i19 | 235 |
| ⋮ | ⋮ | ⋮ |
| i2 | i7 | 175 |
| i2 | i8 | 254 |
| ⋮ | ⋮ | ⋮ |

INFORMATION PROCESSING APPARATUS, INFORMATION PROCESSING METHOD, AND INFORMATION PROCESSING PROGRAM

CROSS REFERENCE TO RELATED APPLICATION

This application is based upon and claims the benefit of priority under 35 U.S.C.§119 from Japanese Patent Application No. 2013-136121, filed on Jun. 28, 2013, the entire contents of which are incorporated herein by reference.

BACKGROUND

The present disclosure relates to an information processing apparatus, an information processing method and an information processing program for selecting an item relevant to another item.

In recent years, thanks to the progress of digital and network technology, distribution and sale of items such as digital contents and articles, which use a network, have increased. Moreover, opportunities to collect information through a search site and the like have also increased.

Following the above, there have been enhanced needs for selecting information about an item, in which it is highly possible that a user may be interested, and information corresponding to a purpose, from among a large number of items, and then to provide the selected information.

For example, one of the technologies for recommending the item is recommendation processing using collaborative filtering. In recommendation processing using collaborative filtering, usage information such as a large number of browsing histories and usage histories is accumulated, and an aggregate of items, which are relevant to a certain item, is recommended by using the usage information.

Moreover, there have been enhanced needs for a technology for recommending an item also in a period such as a service starting time when there is little usage information.

For example, a technology for recommending an item in which there is little usage information is disclosed in Japanese Patent Laid-Open Publication No. 2012-059183 (Patent Literature 1).

SUMMARY

In the technology described in Patent Literature 1, in an event of presenting an item relevant to an item browsed by the user, another item, which has many of the same keywords as other highly-relevant keywords given to the browsed item, is preferentially presented. In such a way, such a relevant item can be presented even in a state where there is little usage information.

However, in Patent Literature 1, since the relevant item has a large number of the same keywords, it is difficult to present an item that has a possibility to be relevant to the browsed item though keywords of both thereof do not coincide with each other. That is to say, since it is difficult to recommend a variety of items, the user has sometimes felt "only similar items are recommended," and has sometimes lost interest in the recommendation.

It is an object of embodiments to provide an information processing apparatus, an information processing method and an information processing program, which are capable of recommending a variety of items.

A first aspect of the embodiments provides an information processing apparatus that selects an item relevant to a reference item, comprising: a usage information storage section configured to store usage information in which a using subject identifier for identifying a using subject and an item identifier for identifying an item used by the using subject are associated with each other; an item information storage section configured to store attribute correspondence information in which the item identifier and an attribute identifier for identifying an attribute of the item are associated with each other; a relevant attribute selection section configured to calculate an attribute relevant degree as a relevant degree between the item identifier and the attribute identifier based on the usage information and the attribute correspondence information, select a relevant attribute as an attribute identifier relevant to the item identifier for each item identifier based on the calculated attribute relevant degree, and create relevant attribute information in which each item identifier and the selected relevant attribute are associated with each other; a relevant attribute information storage section configured to store the relevant attribute information created by the relevant attribute selection section; and a relevant item selection section configured to acquire relevant attribute information from the relevant attribute information storage section, the relevant attribute information including a reference item identifier as an item identifier of the reference item, acquire attribute correspondence information from the item information storage section, the attribute correspondence information including any attribute identifier included in the acquired relevant attribute information, form a relevant candidate item aggregate as an aggregate of item identifiers included in the acquired attribute correspondence information, calculate a relevant degree between each item identifier included in the relevant candidate item aggregate and the reference item, and select the item relevant to the reference item based on the calculated relevant degree.

A second aspect of the embodiments provides an information processing method of selecting an item relevant to a reference item, the information processing method comprising: a usage information storing step of storing, in a usage information storage section, usage information in which a using subject identifier for identifying a using subject and an item identifier for identifying an item used by the using subject are associated with each other; an item information storing step of storing, in an item information storage section, attribute correspondence information in which the item identifier and an attribute identifier for identifying an attribute of the item are associated with each other; a relevant attribute selection step of calculating an attribute relevant degree as a relevant degree between the item identifier and the attribute identifier based on the usage information and the attribute correspondence information, selecting a relevant attribute as an attribute identifier relevant to the item identifier for each item identifier based on the calculated attribute relevant degree, and creating relevant attribute information in which each item identifier and the selected relevant attribute are associated with each other; a relevant attribute information storing step of storing, in a relevant attribute information storage section, the relevant attribute information created by the relevant attribute selection section; and a relevant item selection step of acquiring relevant attribute information from the relevant attribute information storage section, the relevant attribute information including a reference item identifier as an item identifier of the reference item, acquiring attribute correspondence information from the item information storage section, the attribute correspondence information including any attribute identifier included in the acquired relevant attribute information, forming a relevant candidate item aggregate as an aggregate of item identifiers included in the acquired attribute correspondence information, calculating a relevant degree between each item identifier included in the relevant candidate item aggregate and the reference item, and selecting the item relevant to the reference item based on the calculated relevant degree.

A third aspect of the embodiments provides a computer program product stored in a non-transitory computer readable medium for causing a computer to execute information processing for selecting an item relevant to a reference item, the information processing comprising: a usage information storing step of storing, in a usage information storage section, usage information in which a using subject identifier for identifying a using subject and an item identifier for identifying an item used by the using subject are associated with each other; an item information storing step of storing, in an item information storage section, attribute correspondence information in which the item identifier and an attribute identifier for identifying an attribute of the item are associated with each other; a relevant attribute selection step of calculating an attribute relevant degree as a relevant degree between the item identifier and the attribute identifier based on the usage information and the attribute correspondence information, selecting a relevant attribute as an attribute identifier relevant to the item identifier for each item identifier based on the calculated attribute relevant degree, and creating relevant attribute information in which each item identifier and the selected relevant attribute are associated with each other; a relevant attribute information storing step of storing, in a relevant attribute information storage section, the relevant attribute information created by the relevant attribute selection section; and a relevant item selection step of acquiring relevant attribute information from the relevant attribute information storage section, the relevant attribute information including a reference item identifier as an item identifier of the reference item, acquiring attribute correspondence information from the item information storage section, the attribute correspondence information including any attribute identifier included in the acquired relevant attribute information, forming a relevant candidate item aggregate as an aggregate of item identifiers included in the acquired attribute correspondence information, calculating a relevant degree between each item identifier included in the relevant candidate item aggregate and the reference item, and selecting the item relevant to the reference item based on the calculated relevant degree.

BRIEF DESCRIPTION OF THE DRAWINGS

FIG. 3 is a table showing a storage state of a user information storage section 131 in at least one embodiment.

FIGS. 4A to 4D are tables showing storage states of an item information storage section 132 in at least one embodiment.

FIG. 5 is a table showing a storage state of a usage information storage section 133 in at least one embodiment.

FIG. 6 is a table showing a storage state of a relevant attribute information storage section 134 in at least one embodiment.

FIG. 7 is a table showing a storage state of an attribute priority value information storage section 135 in at least one embodiment.

FIG. 8 is a table showing a storage state of a relevant item information storage section 136 in at least one embodiment.

DETAILED DESCRIPTION

With reference to the accompanying drawings, a description is made below of an information processing apparatus, an information processing method and an information processing program according to the embodiments.

Items in the embodiments may be digital contents such as text, voice, music, videos and web pages or a variety of articles, or information about financial instruments, real estates and persons, or the like. That is to say, the items in the embodiment may be either tangible or intangible, and may be either paid or free.

Figure 1:
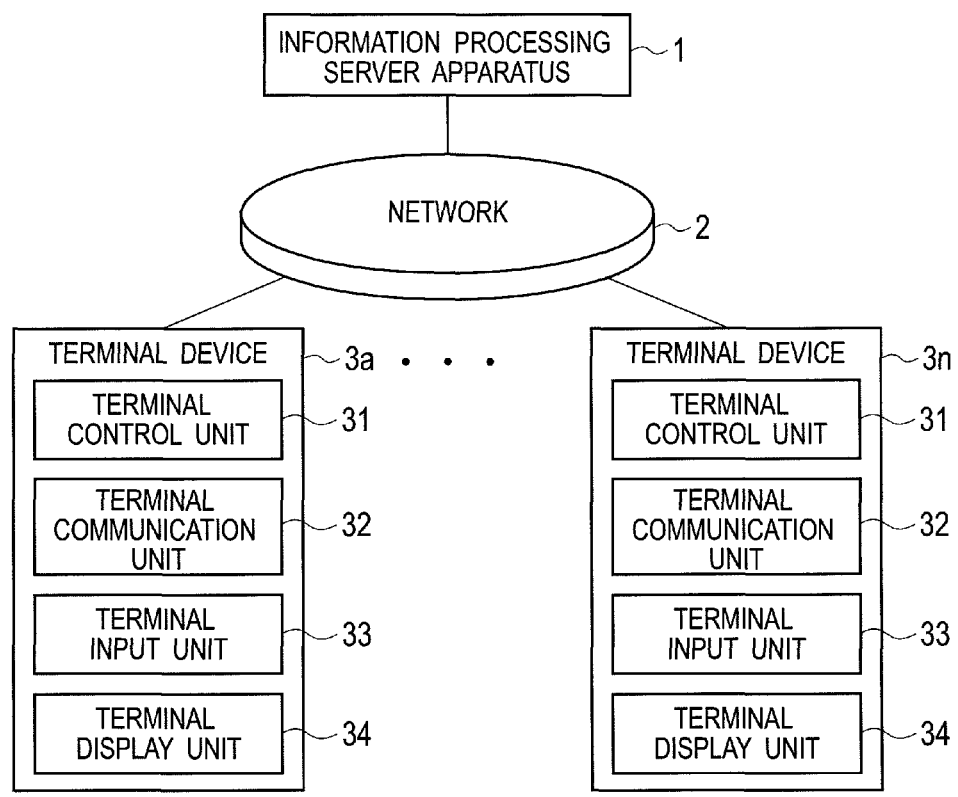
FIG. 1 is a diagram showing a configuration of an entire system in at least one embodiment.

A description is made below of the embodiments in detail using the drawings. FIG. 1 is a configuration diagram of an entire system in an at least one embodiment.

The system in the at least one embodiment is composed in such a manner that an information processing server apparatus 1 and one or more terminal devices 3 (3a to 3n) are connected to each other through a network 2. Note that, in each of the embodiments, only the information processing server apparatus 1 may function as the information processing apparatus, or the information processing server apparatus 1 may function as the information processing apparatus in cooperation with the terminal devices 3.

The network 2 is a network, for example, such as the Internet, and relays transfer of information between the information processing server apparatus 1 and the terminal devices 3.

Each of the terminal devices 3 is a general computer including a CPU, a RAM, a ROM, a hard disk drive, a network interface and the like, or is a portable information terminal such as a cellular phone, a smart phone, and a tablet PC (personal computer).

The terminal device 3 includes a terminal control unit 31, a terminal communication unit 32, a terminal input unit 33 and a terminal display unit 34.

The terminal communication unit 32 communicates with the information processing server apparatus 1 through the network 2.

The terminal input unit 33 is an interface for allowing a user to operate the terminal device 3. For example, the terminal input unit 33 is a mouse and a keyboard if the terminal device 3 is a PC, and buttons if the terminal device 3 is a cellular phone.

The terminal display unit 34 is an interface for displaying various pieces of information and visually showing the information to the user. For example, the terminal display unit 34 is a display.

Through the network 2, the terminal control unit 31 performs usage information transmission processing, relevant item acquisition request transmission processing, and relevant item detail information display processing.

The usage information transmission processing is processing for transmitting usage information to the information processing server apparatus 1 in a case where the user (using user) who uses the terminal device 3 has performed an operation such as browsing and usage of an item.

The usage information is information about the browsing and usage of the item, which are performed by the user, and at least includes a user identifier for uniquely identifying the using user, or a terminal identifier for uniquely identifying the terminal device 3, and an item identifier for uniquely identifying the item taken as a target of the browsing and the usage, and usage date/time information indicating a date or a date and time when the item is browsed and used.

In the embodiments, the description is made by exemplifying a case of using the user identifier; however, a case of using the terminal identifier is also similar. As a generic name of a sense combining the user identifier and the terminal identifier, a term that is a using subject identifier is used. The user or the terminal device used by the user is appropriately referred to as the using subject.

The usage date/time information may be information indicating only a date, or may be information indicating a time minutely up to the unit of milliseconds. The usage date/time information just needs to be information from which the time is grasped up to a required unit in response to a mode of service.

The relevant item acquisition request transmission processing is processing for transmitting a relevant item acquisition request to the information processing server apparatus 1 in a case where the using user has performed such an operation to acquire relevant item detail information relevant to an item browsed thereby, and in a case where the terminal device 3 has performed an operation to automatically acquire the relevant item detail information.

The relevant item detail information is information about one or more items relevant to the browsed item. The relevant item acquisition request at least includes an item identifier of the browsed item. Note that an acquisition restriction number of restricting the number of the relevant items to be acquired may be associated with the relevant item acquisition request.

The relevant item detail information display processing is processing for receiving, from the information processing server apparatus 1, relevant item detail information corresponding to the relevant item acquisition request transmitted by the information processing server apparatus 1, and displaying the received item detail information on the terminal display unit 34.

The information processing server apparatus 1 is an apparatus that transfers various pieces of information with the terminal device 3 through the network 2. It is also possible to implement the information processing server apparatus 1 as software (program) processing by using a computer including a CPU, a RAM, a ROM, a hard disk drive (HDD), a network interface and the like. The information processing server apparatus 1 may be composed by using a plurality of computers.

For example, in order to distribute a load, distribution processing may be performed by using a plurality of computers which perform pieces of processing, which correspond to the respective units of the information processing server apparatus 1. Moreover, the distribution processing may be performed in a mode where processing of a part of the information processing server apparatus 1 is implemented by a certain computer, and processing of another part thereof is implemented by another part of the information processing.

Figure 2:
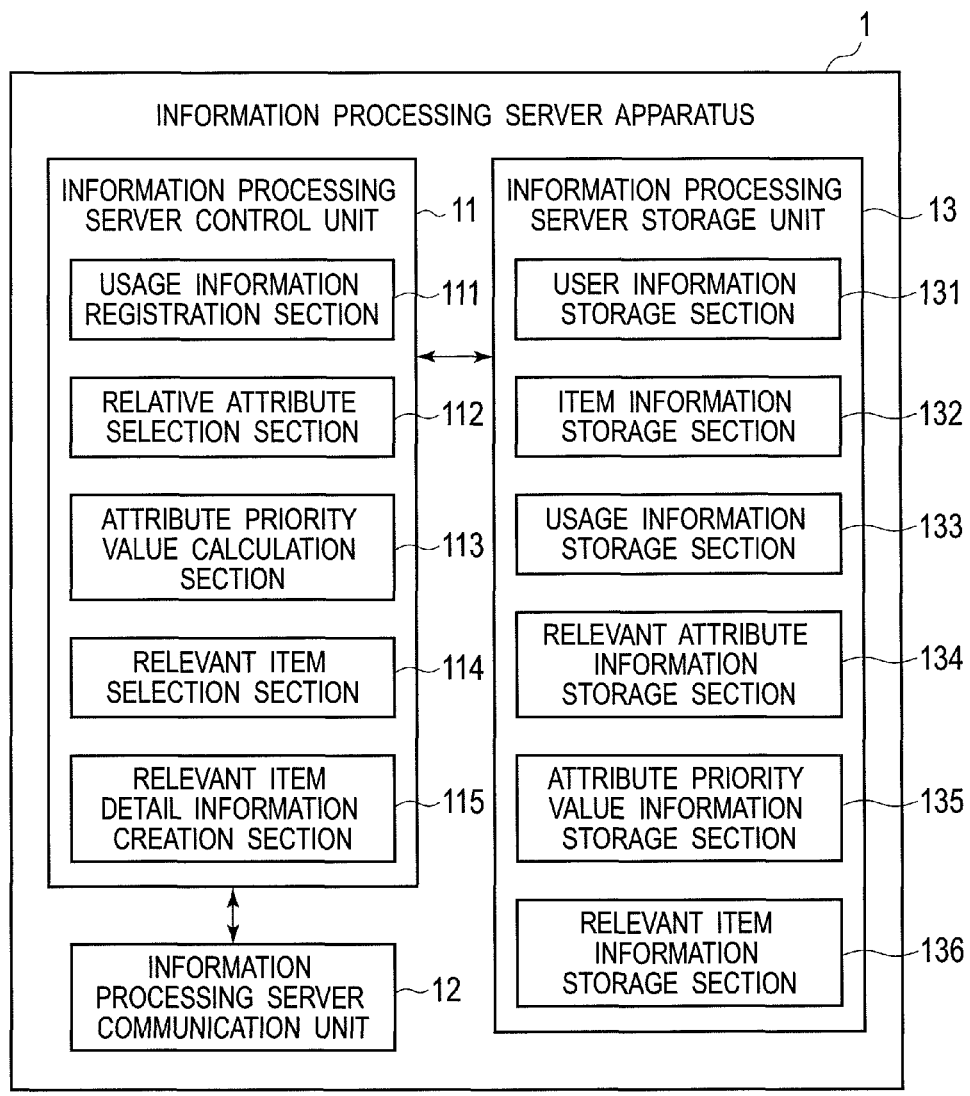
FIG. 2 is a block diagram showing a configuration of an information processing server apparatus 1 in at least one embodiment.

FIG. 2 is a configuration diagram of the information processing server apparatus 1 in at least one embodiment. The information processing server apparatus 1 in at least one embodiment includes an information processing server control unit 11, an information processing server communication unit 12 and an information processing server storage unit 13.

The information processing server communication unit 12 communicates with the terminal device 3 through the network 2.

The information processing server storage unit 13 stores a variety of data by using a storage device such as a memory and a HDD. The information processing server storage unit 13 includes a user information storage section 131, an item information storage section 132, a usage information storage section 133, a relevant attribute information storage section 134, an attribute priority value information storage section 135 and a relevant item information storage section 136.

The user information storage section 131 stores a plurality of pieces of user information. FIG. 3 is a table showing a storage state of the user information storage section 131. The user information is information in which the user identifier (user_id) that uniquely identifies the user who uses the terminal device 3 and user attribute information (user_info) are associated with each other. The user information storage section 131 stores the user information in a table format as shown in FIG. 3.

The user attribute information is user-related information including a name, an age, a gender, an address (region), a hobby, a date/time (month and year, date, time and date, and the like) when the user is admitted, a mail address, a telephone number and the like. Moreover, if it is possible to purchase commercial goods by the information processing server apparatus 1, the user attribute information may include credit card information for making payment for the commercial goods.

The item information storage section 132 individually stores a plurality of pieces of item identification information, a plurality of pieces of attribute type information, a plurality of pieces of attribute value information, and a plurality of pieces of attribute correspondence information. FIGS. 4A to 4D are tables showing storage states of the item information storage section 132.

The item identification information is information in which the item identifier (item_id) for uniquely identifying the item and a name (item_name) of the item are associated with each other. The item information storage section 132 stores the item identification information in a table format as shown in FIG. 4A. The item_id is unique, and cannot be registered twice or more.

The attribute type information is information in which an attribute type identifier (type_id) for uniquely identifying a type of an item attribute and a name of the type of the item attribute are associated with each other. The item information storage section 132 stores the attribute type information in a table format as shown in FIG. 4B.

The type of the item attribute applies to an entry of the item attribute, and for example, is "implementer", "category", "year of production", "price", "condition of user suitable for use", and the like of the item. The type_id is unique, and cannot be registered twice or more.

The attribute value information is information in which the attribute type identifier (type_id), an attribute value identifier (attr_id) for uniquely identifying an attribute value corresponding to the attribute type identifier, and an attribute value (attr_name) are associated with one another. The item information storage section 132 stores the attribute value information in a table format as shown in FIG. 4C.

For example, in a case of an identifier in which the item relates to "book" and the type_id applies to "category", the attribute value becomes "fiction", "love", "cooking" and the like. A combination of (type_id, attr_id) is unique, and cannot be registered twice or more.

The attribute correspondence information is information in which attributes corresponding to the item are associated with one another. Specifically, the attribute correspondence information is information in which the item identifier (item_id), the attribute type identifier (type_id) and the attribute value identifier (attr_id) are associated with one another. The item information storage section 132 stores the attribute correspondence information in a table format as shown in FIG. 4D. A combination of (item_id, type_id, attr_id) is unique, and cannot be registered twice or more.

By using such tables of FIG. 4A to FIG. 4D, a plurality of the attributes owned by the item can be managed for each type of the attributes. Note that a combination of item identification information corresponding to a certain item and of attribute type information and attribute value information, which are specified from attribute correspondence information corresponding to the item, is defined as item attribute information. Moreover, a combination of the type name and the attr_name is defined as an item attribute. A combination of the type_id and attr_id is defined as the attribute identifier.

In the embodiments, the attribute identifier is treated as the combination of the attribute type identifier and the attribute value identifier. However, in a case of such a service in which the type of the item attribute is not present (the attribute type identifier is not present), only the attribute value identifier may be treated as the attribute identifier. In this case, it becomes unnecessary to store the attribute type information.

The usage information storage section 133 stores a plurality of pieces of the usage information. FIG. 5 is a table showing a storage state of the usage information storage section 133.

As shown in FIG. 5, the usage information storage section 133 associates the user identifier (user_id), the item identifier (item_id) and the usage date/time information (dl_date), which compose the usage information, with one another, and stores the associated identifiers and information in a table format.

In a case where other information is also included in the usage information, a storage format just needs to be changed in accordance with a mode of the usage information so as to make it possible to store all pieces of information included in the usage information.

The relevant attribute information storage section 134 stores a plurality of pieces of the relevant attribute information. FIG. 6 is a table showing a storage state of the relevant attribute information storage section 134.

As shown in FIG. 6, the relevant attribute information storage section 134 associates the item identifier (item_id), the attribute type identifier (type_id), the attribute value identifier (attr_id), and an attribute relevant degree (a_value) obtained by digitizing a degree of the relevance, which compose the relevant attribute information, with one another, and stores the associated identifiers and degree in a table format. A combination of (item_id, type_id, attr_id) is defined to be unique, and cannot be registered twice or more.

The attribute priority value information storage section 135 stores a plurality of pieces of attribute priority value information. FIG. 7 is a table showing a storage state of the attribute priority value information storage section 135.

As shown in FIG. 7, the attribute priority value information storage section 135 associates the item identifier (item_id), the attribute type identifier (type_id), the attribute value identifier (attr_id), and an attribute priority value (p_value) obtained by digitizing a degree of priority of the attribute, which compose the attribute priority value information, with one another, and stores the associated identifiers and value in a table format. A combination of (item_id, type_id, attr_id) is defined to be unique, and cannot be registered twice or more.

The relevant item information storage section 136 stores a plurality of pieces of relevant item information. FIG. 8 is a table showing a storage state of the relevant item information storage section 136.

As shown in FIG. 8, the relevant item information storage section 136 associates an item identifier (reference item identifier (base item_id)) of an item (reference item) serving as a reference for composing the relevant item information, an item identifier (relevant item identifier (sim_item_id)) of a relevant item to the reference item, and a relevant degree (s_value), which is obtained by digitizing a degree of relevance between the reference item and the relevant item, with one another, and stores the associated identifiers and relevant degree in a table format. A combination of (base item_id, sim_item_id) is defined to be unique, and cannot be registered twice or more.

By designating the reference item identifier, all of the relevant item identifier corresponding to the reference item can be acquired.

Here, in order to store two types of the item identifiers in one table, names which are the base item_id and the sim_item_id are assigned thereto, whereby the item identifiers are distinguished; however, these are the same as the item_id stored in the item information storage section 132.

For example, the reference item is an item taken as a target of the browsing, and may be other arbitrary items to be designated by various methods.

The information processing server control unit 11 entirely controls the respective units which compose the information processing server apparatus 1. The information processing server control unit 11 includes a usage information registration section 111, a relevant attribute selection section 112, an attribute priority value calculation section 113, a relevant item selection section 114, and a relevant item detail information creation section 115.

The usage information registration section 111 receives the usage information from the terminal device 3 through the network 2, and stores the received usage information in the usage information storage section 133.

The relevant attribute selection section 112 performs relevant attribute selection processing at each piece of predetermined timing. The predetermined timing may be set at a predetermined time interval (for example, every 24 hours), or may be set every time the usage information is received.

Moreover, the time interval may be varied so as to be set at every 3 hours from Monday to Friday, at every 6 hours on Saturday, and at every 12 hours on Monday. Furthermore, the time interval may be changed in response to the seasons so as to be shortened in summer and to be lengthened in winter.

Figure 9:
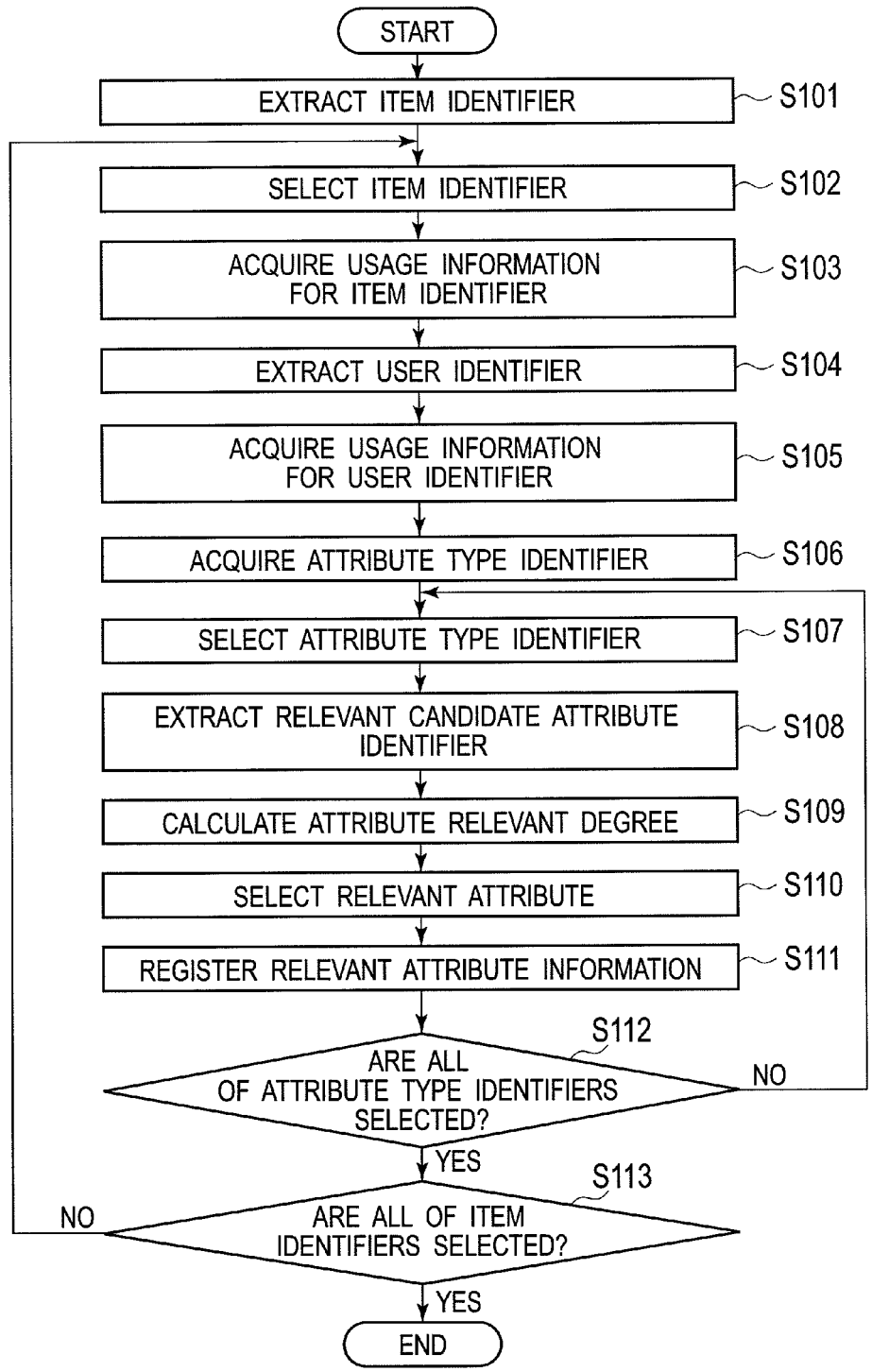
FIG. 9 is a flowchart showing a procedure of relevant attribute selection processing in at least one embodiment.

A description is made of a procedure of relevant attribute selection processing by using a flowchart of FIG. 9.

First, the relevant attribute selection section 112 extracts, without any duplication, all of the item identifiers, which are included in the usage information, from the usage information storage section 133 (Step S101).

At this time, the usage information from which the item identifiers are extracted is limited to such information including usage date/time information that applies a range going back a predetermined period from the point of time of the relevant attribute selection processing (the predetermined period is previously decided, for example, to be three months by a service provider), whereby the relevant attribute information may be selected only for the items used immediately before.

From among the item identifiers extracted in Step S101, the relevant attribute selection section 112 extracts one, for example, in order of the extraction (Step S102).

The relevant attribute selection section 112 acquires all pieces of the usage information, which have the item identifier selected in Step S102, from the usage information storage section 133 (Step S103).

At this time, the usage information to be acquired is limited to such information including the usage date/time information that applies the range going back a predetermined period from the point of time of the relevant attribute selection processing (the predetermined period is previously decided, for example, to be three months by the service provider), whereby the relevant attribute information may be selected by using only the latest usage information.

Moreover, the usage information is acquired up to a predetermined number of pieces in order close to the point of time of the relevant attribute selection processing (the predetermined number of pieces is preset, for example, at ten by the service provider), whereby a calculation amount in the event of selecting the relevant attribute information may be reduced.

The relevant attribute selection section 112 extracts, without any duplication, all of the user identifiers from the usage information acquired in Step S103 (Step S104).

The relevant attribute selection section 112 acquires all pieces of the usage information, which include any of the user identifiers extracted in Step S104, from the usage information storage section 134 (Step S105).

At this time, the usage information to be acquired is limited to such information including the usage date/time information that applies the range going back a predetermined period from the point of time of the relevant attribute selection processing (the predetermined period is preset, for example, to be three months by the service provider), whereby the relevant attribute information may be selected by using only the latest usage information.

Moreover, the usage information is acquired up to a predetermined number of pieces in order close to the point of time of the relevant attribute selection processing (the predetermined number of pieces is preset, for example, at ten by the service provider), whereby the calculation amount in the event of selecting the relevant attribute information may be reduced.

From the item information storage section 132, the relevant attribute selection section 112 acquires targets of the relevant attribute selection among the attribute type identifiers included in the attribute type information (step S106).

Note that, in order to realize the effects of the embodiments, it is necessary for such a service, which manages the types of the item attributes by the attribute type identifiers and the like, to set two or more attribute type identifiers serving as the targets of the relevant attribute selection. The attribute type identifiers as the targets of the relevant attribute selection just need to be preset by the service provider.

The relevant attribute selection section 112 selects one among the attribute type identifiers, which are acquired in Step S106, for example, in order of the acquisition (Step S107).

From the item information storage section 132, the relevant attribute selection section 112 acquires all pieces, which include any of the item identifiers included in the usage information acquired in Step S105, among the attribute correspondence information having the attribute type identifiers selected in Step S107. Moreover, without any duplication, the relevant attribute selection section 112 extracts the attribute identifiers, which are included in the acquired attribute correspondence information, as relevant candidate attribute identifiers (Step S108).

The relevant attribute selection section 112 calculates the attribute relevant degree for each of the relevant candidate attribute identifiers extracted in Step S108 (Step S109).

As a method of calculating the attribute relevant degree, for example, the Jaccard coefficient can be used.

In a case of using the Jaccard coefficient, when Ui is an aggregate of users who have used an item i, Ua is an aggregate of users who have used any item belonging to an item attribute a, |Ui∩Ua| is the number of users who have used both of the item i and any item belonging to the item attribute a, and |Ui∪Ua| is the number of users who have used at least one of either the item i and any item belonging to the item attribute a, then the attribute relevant value sim(i, a) can be calculated by Expression (1).

$$sim(i, a) = \left| \frac{Ui \cap Ua}{Ui \cup Ua} \right| \quad (1)$$

Moreover, by calculating an item preference degree and an attribute preference degree, a cosine distance and a Pearson product-moment correlation coefficient can also be used for the attribute relevant degree calculation.

The item preference degree is a value indicating a degree of user's preference for the item, and can be calculated by using usage information (first usage information) including an item identifier of a calculation target.

Specifically, for example, from the number of pieces of the first usage information, the number of users counted from the first usage information without any duplication, and usage date/time information included in the first usage information, the item preference degree can be calculated by using an elapsed time until the point of time when the attribute relevant degree calculation processing is performed.

The attribute preference degree is a value indicating a degree of user's preference for the attribute, and can be calculated by using usage information (second usage information) including any item identifier corresponding to a relevant candidate attribute identifier of the calculation target.

Specifically, for example, from the number of users counted from the second usage information without any duplication, and usage date/time information included in the second usage information, the attribute preference degree can be calculated by using the elapsed time until the point of time when the attribute relevant degree calculation processing is performed.

In a case of using the cosine distance, for example, when Ui is the aggregate of the users who have used the item i, Vi(i, Ui) is an item preference degree for users ui(ui∈Ui) of the item i, Ua is an aggregate of the users who have used any item belonging to the item attribute a, Va(a, ua) is an attribute preference degree for users ua(ua∈Ua) of the item attribute a, Uc is users who have used both of the item i and any item belonging to the item attribute a, Vi(i, uc) is an item preference value for users uc(uc∈Uc) of the item i, and Va(a, uc) is an attribute preference value for users uc of the item attribute a, then the attribute relevant value sim(i, a) can be calculated by Expression (2).

$$sim(i, a) = \frac{\sum_{uc \in Uc} Vi(i, uc) \times Va(a, uc)}{\sqrt{\sum_{ui \in Ui} Vi(i, ui)^2} \sqrt{\sum_{ua \in Ua} Va(a, ua)^2}} \quad (2)$$

In a case of using the Pearson product-moment correlation coefficient, for example, when Uc is users who have used both of the item i and any item belonging to the item attribute a, n is the number of users belonging to Uc, Vi(i, uc) is the item preference value for the users uc(uc∈Uc) of the item i, Va(a, uc) is the attribute preference value for the users uc of the item attribute a, Vi(i, uc') is an item preference value for users uc'(uc'∈Uc) of the item i, and Va(a, uc') is an attribute preference value for users uc' of the item attribute a, then the attribute relevant value sim(i, a) can be calculated by Expression (3).

$$sim(i, a) = \frac{\sum_{uc \in Uc} \left( Vi(i, uc) - \frac{1}{n} \sum_{uc' \in Uc} Vi(i, uc') \right) \left( Va(a, uc) - \frac{1}{n} \sum_{uc' \in Uc} Va(a, uc') \right)}{\sqrt{\sum_{uc \in Uc} \left( Vi(i, uc) - \frac{1}{n} \sum_{uc' \in Uc} Vi(i, uc') \right)^2 \times \sum_{uc \in Uc} \left( Va(a, uc) - \frac{1}{n} \sum_{uc' \in Uc} Va(a, uc') \right)^2}} \quad (3)$$

Besides the above, any can be used as long as being an index indicating the relevance between the item and the attribute.

The relevant attribute selection section 112 selects relevant attributes in response to the attribute relevant degree calculated in Step S109 (Step S110). In order to select the relevant attributes, a relevant candidate attribute identifier, in which the attribute relevant degree is a predetermined value or more, (the predetermined value is preset by the service provider), just needs to be selected as the relevant attributes. Moreover, relevant candidate attribute identifiers selected up to a predetermined number (which is preset by the service provider) in a descending order of the attribute relevant degrees just needs to be selected as the relevant attributes.

For each of the relevant attributes selected in Step S110, the relevant attribute selection section 112 stores the relevant attribute information, in which the item identifier selected in Step S102, the combination of the attribute type identifier and the attribute value identifier, which is the relevant attribute, and the attribute relevant degree calculated in Step S109 so as to correspond to the relevant attribute are associated with one another, in the relevant attribute information storage section 134 (Step S111).

The relevant attribute selection section 112 determines whether or not all of the attribute type identifiers are selected in Step S107 (Step S112). In a case where all of the attribute type identifiers are selected, then the processing proceeds to Step S113, and in a case where there is an unselected attribute type identifier, the processing proceeds to Step S107.

In Step S113, the relevant attribute selection section 112 determines whether or not all of the item identifiers are selected in Step S102. In a case where all of the item identifiers are selected, a series of the processing from Step S101 to Step S113 is ended, and in a case where there is an unselected item identifier, the processing proceeds to Step S102.

By this procedure, in such a service that manages the types of the item attributes, pieces of the relevant attribute information, which correspond to two or more attribute type identifiers, are stored in the relevant attribute information storage section 134 for each of the item identifiers.

Note that, as the attribute type identifiers serving as the targets for which the relevant attribute information is created are being increased more and more, the candidates for the items in the event of selecting the relevant items can be increased.

Moreover, in a service in which the types of the item attributes are not managed (in which the attribute type identifiers are not present), the processing of Step S106, Step S107 and Step S112 can be omitted.

The above is the description of the procedure of the relevant attribute selection processing.

Figure 10:
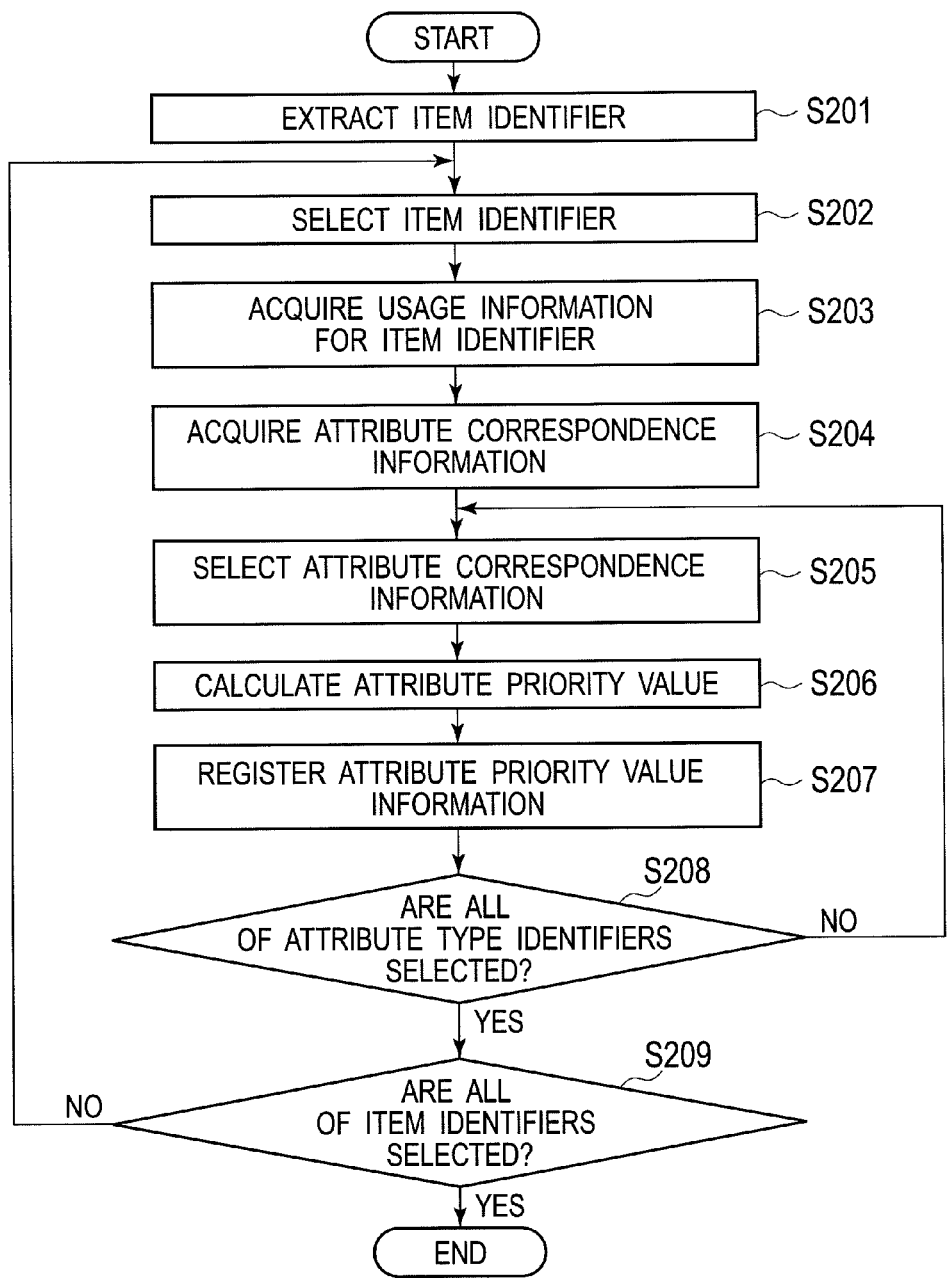
FIG. 10 is a flowchart showing a procedure of attribute priority value calculation processing in at least one embodiment.

The attribute priority value calculation section 113 performs attribute priority value calculation processing at every piece of predetermined timing. A description is made of a procedure of the attribute priority value calculation processing by using a flowchart of FIG. 10.

First, the attribute priority value calculation section 113 extracts, without any duplication, all of the item identifiers, which are included in the usage information, from the usage information storage section 133 (Step S201).

From among the item identifiers extracted in Step S201, the attribute priority value calculation section 113 extracts one, for example, in order of the extraction (Step S202).

The attribute priority value calculation section 113 acquires all pieces of the usage information, which have the item identifier selected in Step S202, from the usage information storage section 133 (Step S203). At this time, the usage information to be acquired is limited to such information including the usage date/time information that applies the range going back a predetermined period from the point of time of the attribute priority value calculation processing (the predetermined period is preset, for example, to be three months by the service provider), whereby the attribute priority value may be calculated by using only the latest usage information.

The attribute priority value calculation section 113 acquires all pieces of the attribute correspondence information, which include the item identifiers selected in Step S202, from the item information storage section 132 (Step S204). Note that, in the event of acquiring the attribute correspondence information, the attribute correspondence information may be limited to one including any of one or more attribute type identifiers preset by the service provider.

The attribute priority value calculation section 113 selects one among the pieces of the attribute correspondence information, which are acquired in Step S204, for example, in order of the acquisition (Step S205).

The attribute priority value calculation section 113 calculates the attribute priority value for the attribute correspondence information selected in Step S205 (Step S206).

A description is made below of seven types of a calculation method of the attribute priority value.

A first method of the attribute priority value calculation is a method of uniformly calculating the same value (for example, "1") for the item attributes, each of which corresponds to any attribute correspondence information. In the first method of the attribute priority value calculation, the item attributes are treated equally whatever the attribute priority value calculation may be.

A second method of the attribute priority value calculation is a method of calculating the attribute priority value so that the value concerned can be larger as the number of items belonging to the item attribute corresponding to the attribute correspondence information selected in Step S205 is smaller. Specifically, in a case where $|I(tx, txy)|$ is the number of item aggregates $I(tx, txy)$ belonging to an attribute identifier $(tx, txy)$ (a pair of an attribute type identifier tx and an attribute value identifier txy) of the item attribute, then by using a constant $\alpha 1$ ($>0$), an attribute priority value $pv(i, tx, txy)$ corresponding to the item i just needs to be calculated by Expression (4).

$$pv(i,tx,txy)=|I(tx,txy)|^{-\alpha 1} \quad (4)$$

In the second method of the attribute priority value calculation, such minute-granularity item attributes in which the number of items belonging to the item attribute concerned are smaller, are weighted more, and on the contrary, such coarse-granularity item attributes in which the number of items belonging to the item attribute concerned are larger, are weighted less. As a matter of course, any expression may be used as long as the attribute priority value is monotonously reduced with respect to the number of the items belonging to the item attribute.

A third method of the attribute priority calculation is a method of calculating the attribute priority value so that the value concerned can be larger as the number of the attribute value identifiers corresponding to the attribute type identifier corresponding to the attribute correspondence information selected in Step S205 is larger.

Specifically, in a case where $|A(tx)|$ is the number of aggregates $A(tx)$ of the attribute value identifier corresponding to the attribute type identifier tx of the item attribute, then by using a constant $\beta 1$ ($\geq 1$), the attribute priority value $pv(i, tx, txy)$ corresponding to the item i just needs to be calculated by Expression (5).

$$pv(i,tx,txy)=\log(|A(tx)|+1) \quad (5)$$

In the third method of the attribute priority value calculation, an attribute type, in which such minute-granularity attribute values with a large number of the attribute values corresponding to the attribute type concerned are set, is weighted more, and on the contrary, an attribute type, in which such coarse-granularity attribute values with a small number of the attribute values corresponding to the attribute type concerned are set, is weighted less.

As a matter of course, any expression may be used as long as the attribute priority value is monotonously increased with respect to the number of the attribute values corresponding to the item type.

A fourth method of the attribute priority value calculation is a method of calculating the attribute priority value so that the value concerned can be larger as the items belonging to the item attribute corresponding to the attribute correspondence information selected in Step S205 are used more frequently.

Specifically, in a case where $|L(tx, txy)|$ is the number of aggregates $L(tx, txy)$ of the usage information related to use of any item in the item aggregate $I(tx, txy)$ belonging to the attribute identifier $(tx, txy)$ of the item attribute, then the attribute priority value can be calculated by replacing $|A(tx)|$ of Expression (5) with $|L(tx, txy)|$.

In the fourth method of the attribute priority value calculation, such an item attribute, to which many popular items used many times by many users belong, can be weighted more.

As a matter of course, any expression may be used as long as the attribute priority value is monotonously increased with respect to the number of use of the items belonging to the item attribute.

A fifth method of the attribute priority value calculation is a method of calculating the attribute priority value so that the value concerned can be larger as users who have used the items belonging to the item attribute corresponding to the attribute correspondence information selected in Step S205 are more.

Specifically, in a case where $|U(tx, txy)|$ is the number of user aggregates $U(tx, txy)$ extracted without any duplication from the aggregate $L(tx, txy)$ of the usage information related to the use of any item included in the item aggregate $I(tx, txy)$ belonging to the attribute identifier $(tx, txy)$ of the item attribute, then the attribute priority value can be calculated by replacing $|A(tx)|$ of Expression (5) with $|U(tx, txy)|$.

In the fifth method of the attribute priority value calculation, such a popular item attribute as used by many users can be weighted more.

As a matter of course, any expression may be used as long as the attribute priority value is monotonously increased with respect to the number of users who have used the items belonging to the item attribute.

A sixth method of the attribute priority value calculation is a method of calculating the attribute priority value so that the value concerned can be larger as the number of times that the items corresponding to the item identifier selected in Step S202 are used is larger.

Specifically, in a case where $|L(i)|$ is the number of aggregates $L(i)$ of the usage information related to the use of the item i, then the attribute priority value can be calculated by replacing $|A(tx)|$ of Expression (5) with $|L(i)|$. In the sixth method of the attribute priority value calculation, the popular items used many times by many users can be weighted more. As a matter of course, any expression may be used as long as the attribute priority value is monotonously increased with respect to the number of times of use of the items.

A seventh method of the attribute priority value calculation is a method of calculating the attribute priority value so that the value concerned can be larger as the number of users who have used the items corresponding to the item identifier selected in Step S202 is larger.

Specifically, in a case where $|U(i)|$ is the number of user aggregates $U(i)$ extracted without any duplication from the aggregate $L(i)$ of the usage information related to the use of the item i, then the attribute priority value can be calculated by replacing $|A(tx)|$ of Expression (5) with $|U(i)|$. In the seventh method of the attribute priority value calculation, such popular items as used by many users can be weighted more.

As a matter of course, any expression may be used as long as the attribute priority value is monotonously increased with respect to the number of users who have used the items.

Moreover, the attribute priority value may be calculated by combining the second to seventh methods of the attribute priority value calculation with one another. For example, the attribute priority value may be calculated as in Expression (6) and Expression (7) by combining the second and fourth methods with each other. Besides the above, the calculation methods may be freely combined with one another so that properties thereof cannot be changed. The above is the description of the calculation method of the attribute priority value.

$$pv(i,tx,txy) = |(tx,txy)|^{-\alpha 1} + \log(|L(tx,txy)| + \beta 1) \quad (6)$$

$$pv(i,tx,txy) = |(tx,txy)|^{-\alpha 1} \times \log(|L(tx,txy)| + \beta 1) \quad (7)$$

The attribute priority value calculation section 113 stores the attribute priority value information, in which the item identifier, the attribute type identifier and the attribute value identifier, which are included in the attribute correspondence information selected in Step S205, and the attribute priority value calculated in Step S206 are associated with one another, in the attribute priority value information storage section 135 (Step S207).

The attribute priority value calculation section 113 determines whether or not all pieces of the attribute correspondence information are selected in Step S205 (Step S208). In a case where all pieces are selected, the processing proceeds to Step S209, and in a case where there is an unselected piece, the processing proceeds to Step S205.

In Step S209, the attribute priority value calculation section 113 determines whether or not all of the item identifiers are selected in Step S202. In a case where all of the item identifiers are selected, a series of the processing from Step S201 to Step S209 is ended, and in a case where there is an unselected item identifier, the processing proceeds to Step S202.

The above is the description of the procedure of the attribute priority value calculation processing.

Figure 11:
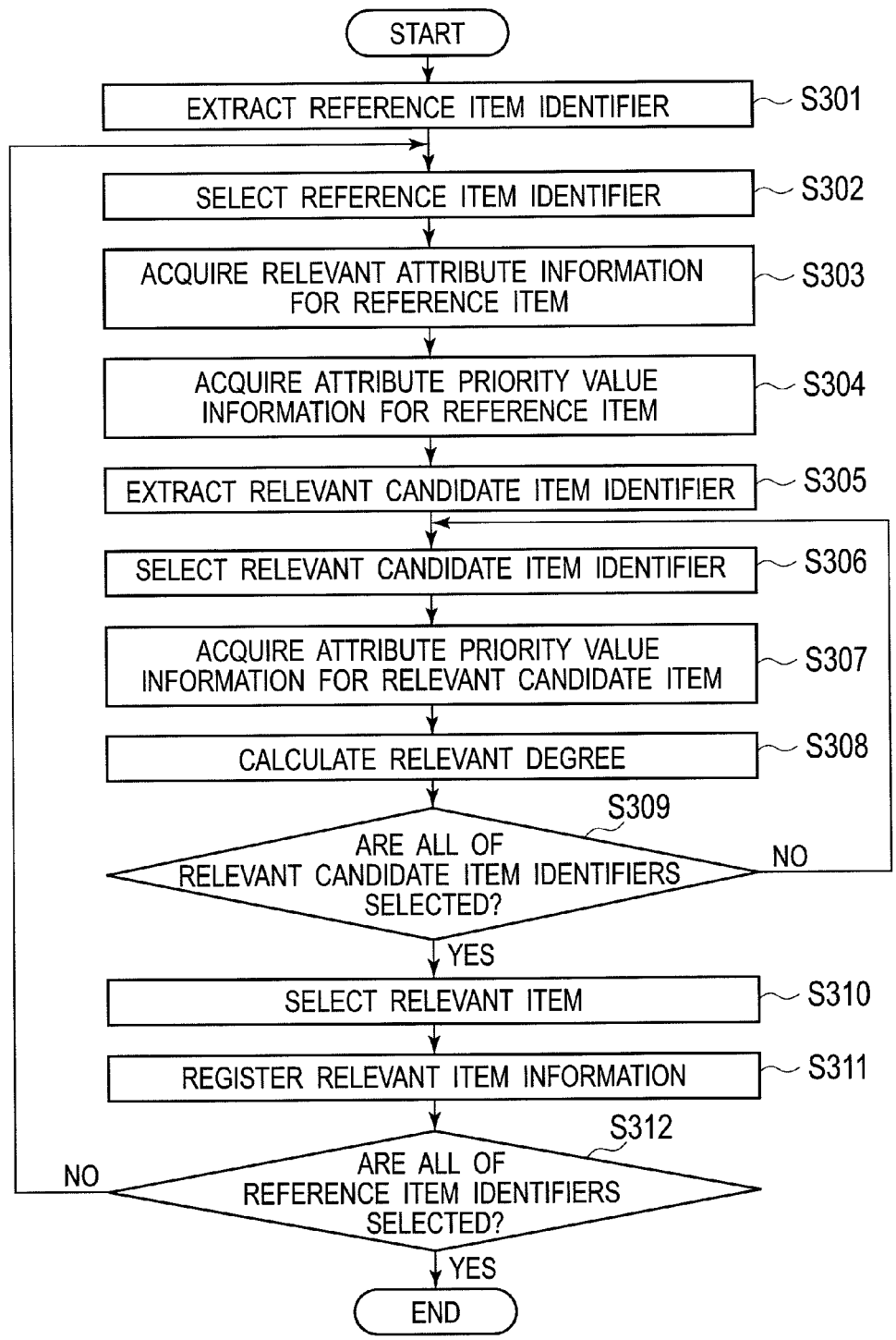
FIG. 11 is a flowchart showing a procedure of relevant item selection processing in at least one embodiment.

The relevant item selection section 114 performs relevant item selection processing at every piece of predetermined timing. A description is made of a procedure of the relevant item selection processing by using a flowchart of FIG. 11.

First, the relevant item selection section 114 extracts, without any duplication, all of the item identifiers, which are included in the relevant attribute information, as the reference item identifiers from the relevant attribute information storage section 134 (Step S301).

From among the reference item identifiers extracted in Step S301, the relevant item selection section 114 selects one, for example, in order of the extraction (Step S302).

From the relevant attribute information storage section 134, the relevant item selection section 114 acquires all pieces of the relevant attribute information, which have item identifiers coinciding with the reference item identifier selected in Step S302 (Step S303).

From the attribute priority value information storage section 135, the relevant item selection section 114 acquires all pieces of the attribute priority value information, which have item identifiers coinciding with the reference item identifier selected in Step S302 (Step S304).

From the item information storage section 132, the relevant item selection section 114 specifies attribute correspondence information including attribute identifiers included in the relevant attribute information acquired in Step S303, and extracts all of the item identifiers, which are included in the specified attribute correspondence information, as the relevant candidate item identifiers without any duplication (Step S305). Note that an aggregate of the relevant candidate item identifiers extracted herein becomes an aggregate of the relevant candidate items.

From among the relevant candidate item identifiers extracted in Step S305, the relevant item selection section 114 selects one, for example, in order of the extraction (Step S306).

From the attribute priority value information storage section 135, the relevant item selection section 114 acquires all pieces of the attribute priority value information, which have the item identifiers coinciding with the relevant candidate item identifier selected in Step S306 (Step S307).

The relevant item selection section 114 calculates the relevant degree between the reference item identifier selected in Step S302 and the relevant candidate item identifier selected in Step S306 (Step S308).

A description is made below of five types of the calculation method of the relevant value. Note that, in the description in the calculation method, ST(ib) is an aggregate of the pieces of the relevant attribute information, which correspond to the reference item ib acquired in Step S303.

A first method of the relevant degree calculation is a method of calculating, as the relevance, the number of pieces of the relevant attribute information including the attribute identifiers corresponding to the relevant candidate item identifier selected in Step S306. In the first method of the relevant degree calculation, a calculation amount thereof is small.

A second method of the relevant degree calculation is a method of calculating the relevant degree by using an attribute relevant degree of relevant attribute information including any attribute identifier corresponding to the relevant candidate item identifier selected in Step S306.

Specifically, in a case where |TA(ib, ir)| is the number of aggregates TA(ib, ir) of attribute identifiers extracted from those including any attribute identifier corresponding to a relevant candidate item ir, the aggregates TA being extracted from ST(ib), and sim(ib, tx, txy) is an attribute relevant degree to the reference item ib corresponding to an arbitrary attribute identifier (tx, txy) included in TA(ib, ir), then by using $\alpha 2$ ($0 \le \alpha 2 \le 1$), rate(ib, ir) as the relevant degree can be calculated by Expression (8).

$$\text{rate}(ib, ir) = \frac{\sum_{(tx,txy) \in TA(ib,ir)} sim(ib, tx, txy)}{|TA(ib, ir)|^{\alpha 2}} \quad (8)$$

In the second method of the relevant degree calculation, as any item attribute corresponding to the relevant candidate item is being included in many pieces of the relevant attribute information, and as the attribute relevant degrees included in the relevant attribute information are larger, the relevant degree tends to be high.

Note that, in a case where $\alpha 2$ is "0", Expression (8) obtains a total sum of the attribute relevant degrees, and in a case where $\alpha 2$ is "1", Expression (8) obtains an average value of the attribute relevant degrees. That is to say, in a case of enhancing an influence of the number of pieces of the relevant attribute information, $\alpha 2$ just needs to be approximated to "0".

As a matter of course, other expressions may be used as long as the attribute priority value is monotonously increased with respect to both of the number of pieces of the relevant attribute information and the attribute relevant degree.

A third method of the relevant degree calculation is a calculation method of using the attribute relevant degree in a similar way to the second method of the relevant degree calculation, and of changing the weighting of the corresponding attribute relevant degree for each of the attribute type identifiers.

Specifically, for each of the attribute type identifiers included in the aggregate T of the attribute type identifiers serving as the calculation targets of the attribute relevant degree calculation, a weighting factor m1(tx) corresponding to an attribute type identifier tx(ET) is preset, and then there is formed an aggregate ST(ib, ir) of the pieces of the relevant attribute information including any attribute identifier among the attribute identifiers corresponding to the relevant candidate item ir.

Next, a subset T(ib, ir) of T extracted from ST(ib, ir) without duplication is formed. Then, in a case where |TA(ib, ir, t'x)| is the number of aggregates TA(ib, ir, t'x) of the attribute identifiers extracted from those including attribute type identifiers t'x(∈T(ib, ir)), those being among the relevant attribute information included in ST(ib, ir), and av(ib, t'x, t'xy) is an attribute relevant degree corresponding to an arbitrary attribute identifier (t'x, t'xy) of TA(ib, ir, t'x), then rate(ib, ir) as the relevant degree can be calculated by Expression (9) by using α3 (0≤α3≤1).

$$\text{rate}(ib, ir) = \frac{\sum_{t'x \in T(ib,ir)} \sum_{(t'x,t'_{xy}) \in TA(ib,ir,t'x)} m1(t'x) \times av(ib, t'x, t'xy)}{\left(\sum_{t'x \in T(ib,ir)} m1(t'x) \times |TA(ib, ir, t'x)|\right)^{\alpha 3}} \quad (9)$$

Note that it is recommended that the weighting factor m1(tx) corresponding to the attribute type identifier tx(ET) absorbs a difference in granularity between the attribute types by being calculated in accordance with the granularity of each type of the attributes in a similar way to the third method of the attribute priority value calculation; however, as a matter of course, the service provider may freely set the weighting factor m1(tx) while being free from the difference in granularity between the attribute types.

In the third method of the relevant degree calculation, in addition to the property of the second method of the relevant degree calculation, the weighting is changed for each type of the attributes, whereby the service provider can freely set the attribute type, to which the attribute relevant degree serving as a priority target corresponds.

A fourth method of the relevant degree calculation is a calculation method of using the attribute relevant degree in a similar way to the second method of the relevant degree calculation, and of changing the weighting of the corresponding attribute relevant degree for each of the attribute identifiers.

Specifically, for each of the aggregates TA of the attribute identifiers including the attribute type identifiers serving as the calculation targets of the attribute relevant degree calculation, a weighting factor m2(tx, txy) corresponding to the attribute identifier (tx, txy) is set, and then in a case where av(ib, t'x, t'xy) is an attribute relevant degree corresponding to an arbitrary attribute identifier (t'x, t'xy) of the subset TA(ib, ir) extracted without any duplication from the relevant attribute information including any attribute identifier among the attribute identifiers corresponding to the relevant candidate item ir, TA being extracted from ST(ib), then rate(ib, ir) as the relevant degree can be calculated by Expression (10) by using α4 (0≤α4≤1).

$$\text{rate}(ib, ir) = \frac{\sum_{(t'x,t'xy) \in TA(ib,ir)} m2(t'x, t'xy) \times av(ib, t'x, t'xy)}{\left(\sum_{(t'x,t'xy) \in TA(ib,ir)} m2(t'x, t'xy)\right)^{\alpha 4}} \quad (10)$$

Note that, in a similar way to the second method of the attribute priority value calculation, it is recommended that the weighting factor m2(tx, txy) corresponding to the attribute identifier (tx, txy) absorbs a difference in granularity between the item attributes by being calculated in accordance with the granularity of each of the item attributes; however, as a matter of course, the service provider may freely set the weighting factor m2(tx, txy) while being free from the difference in granularity between the item attributes.

In the fourth method of the relevant degree calculation, in addition to the property of the second method of the relevant degree calculation, the weighting is changed for each of the item attributes, whereby the service provider can freely set the item attribute, to which the attribute relevant degree serving as a priority target corresponds.

A fifth method of the relevant degree calculation is a method of calculating the relevant degree by using the attribute priority value information for the reference item acquired in Step S304 and the attribute priority value information for the relevant candidate item acquired in Step S307.

Specifically, in a case where pv(ib, t'x, t'xy) (reference item) and pv(ir, t'x, t'xy) (relevant candidate item) are individually attribute priority values corresponding to attribute identifiers (t'x, t'xy) included in an intersection TA'(ib) ∩TA"(ir) of an aggregate TA'(ib) of attribute identifiers extracted without any duplication from an aggregate TP(ib) of the attribute priority value information acquired for the reference item ib and of an aggregate TA'(ir) of attribute identifiers extracted without any duplication from an aggregate TP(ir) of the attribute priority value information acquired for the relevant candidate item ir, then rate(ib, ir) as the relevant degree may be calculated as an inner product value as in Expression (11).

$$\text{rate}(ib, ir) = \sum_{(t'x,t'xy) \in TA'(ib) \cap TA'(ir)} pv(ib, t'x, t'xy) \times pv(ir, t'x, t'xy) \quad (11)$$

Moreover, rate(ib, ir) as the relevant degree may be calculated as a cosine distance or a Pearson product-moment correlation coefficient. In the fifth method of the relevant degree calculation, the relevant degree between the reference item and the relevant candidate item is calculated by using the attribute priority value, whereby it becomes easy to preferentially select, as the relevant item, the one approximate to the reference item in terms of the item attribute. Moreover, the property of the method used for the attribute priority value calculation is also reflected.

Moreover, the relevant value may be calculated by combining the second to fifth methods of the attribute priority value calculation with one another. For example, the relevant value may be calculated as in Expression (12) by combining the third and fourth methods with each other.

$$\text{rate}(ib, ir) = \frac{\sum_{(t'x, t'xy) \in TA(ib, ir)} m1(t'x) \times m2(t'x, t'xy) \times av(ib, t'x, t'xy)}{\left( \sum_{(t'x, t'xy) \in TA(ib, ir)} m1(t'x) \times m2(t'x, t'xy) \right)^{\alpha 3}} \quad (12)$$

Furthermore, by using rate2(ib, ir) as a relevant value calculated by the second method and rate5(ib, ir) as a relevant value calculated by the fifth method, new_rate(ib, ir) as a new relevant value may be calculated as the relevant value as in Expression (13) and Expression (14). Besides, the calculation methods may be freely combined with one another so that properties thereof cannot be changed.

$$\text{new\_rate}(ib, ir) = \text{rate2}(ib, ir) \times \text{rate5}(ib, ir) \quad (13)$$

$$\text{new\_rate}(ib, ir) = \text{rate2}(ib, ir) + \text{rate5}(ib, ir) \quad (14)$$

The relevant item selection section 114 determines whether or not all of the relevant candidate item identifiers are selected in Step S306 (Step S309). In a case where all of the relevant candidate item identifiers are selected, the processing proceeds to Step S310, and in a case where there is an unselected relevant candidate item identifier, the processing proceeds to Step S306.

In Step S310, the relevant item selection section 114 selects the relevant item in response to the relevant degree calculated in Step S308. In order to select the relevant item, such a relevant candidate item identifier, in which the relevant value is a predetermined value (which is preset by the service provider) or more, just needs to be selected as the relevant item. Moreover, relevant candidate item identifiers selected up to a predetermined number (which is preset by the service provider) in a descending order of the relevant degrees just need to be selected as the relevant items.

For each of the relevant items selected in Step S310, the relevant item selection section 114 stores the relevant item information, in which the reference item identifier selected in Step S302, the one obtained by defining, as the relevant item identifier, the relevant candidate item identifier selected as the relevant item identifier, and the relevant value calculated in Step S308 are associated with one another, in the relevant item information storage section 136 (Step S311).

The relevant item selection section 114 determines whether or not all of the reference item identifiers are selected in Step S302 (Step S312). In a case where all of the reference item identifiers are selected, a series of the processing from Step S301 to Step S312 is ended, and in a case where there is an unselected reference item identifier, the processing proceeds to Step S302.

Figure 12:
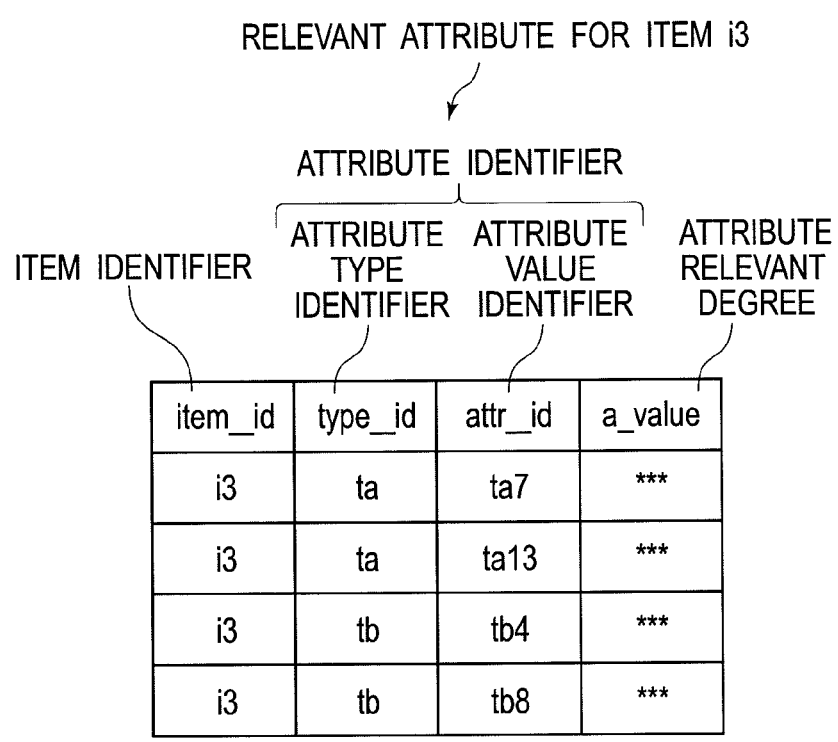
FIG. 12 is a table showing relevant attributes for an item i3 in at least one embodiment.
Figure 13:
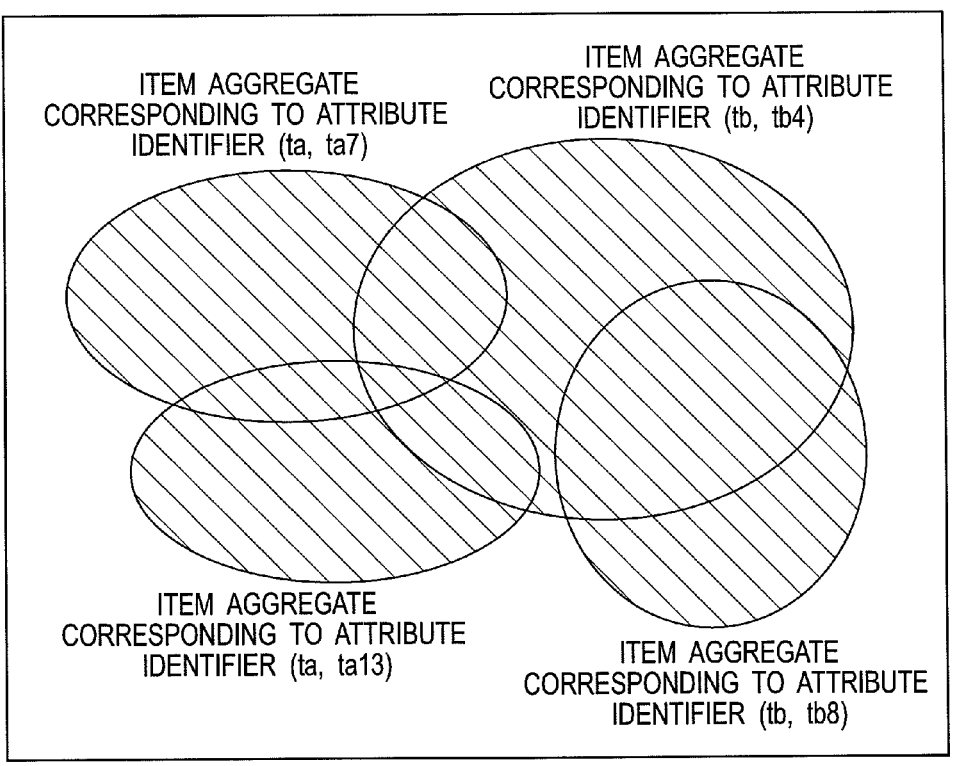
FIG. 13 is a view showing a concept of item aggregates of relevant candidate items for the item i3 in at least one embodiment.

By using FIG. 12 and FIG. 13, a description is made of a specific example showing actual effects brought by this procedure.

FIG. 12 shows relevant attribute for an item i3. As shown in FIG. 12, it is understood that the relevant attributes of the item i3 are (ta, ta7), (ta, ta13), (tb, tb4) and (tb, tb8).

FIG. 13 is a view showing a concept of item aggregates serving as targets of the relevant candidate items for the item i3.

As shown in FIG. 13, there are item aggregates I(ta, ta7), I(ta, ta13), I(tb, tb4) and I(tb, tb8), which individually correspond to the relevant attributes of the item i3. Additionally the hatched portion becomes an item aggregate I(ta, ta7)∪I(ta, ta13)∪I(tb, tb4)∪I(tb, tb8).

That is to say, it becomes possible to select the relevant item from items belonging to any of I(ta, ta7), I(ta, ta13), I(tb, tb4) and I(tb, tb8). Accordingly, it becomes possible to recommend the item even if the usage information is little, and in addition, by using the various item attributes, the recommendation of the various items can be realized.

Note that, in the above-described procedure, in a case where the attribute priority value is not used for the calculation of the relevant degree, the processing of Step S304 and Step S307 can be omitted. Moreover, it becomes unnecessary to create the attribute priority value information, and accordingly, the attribute priority value calculation section 113 and the attribute priority value information storage section 135 become unnecessary.

The above is the description of the procedure of the relevant item selection processing.

Upon receiving the relevant item acquisition request from the terminal device 3 through the information processing server communication unit 12, the relevant item detail information creation section 115 performs relevant item detail information creation processing, thereby creates the relevant item detail information, and transmits the created relevant item detail information to the terminal device 3.

The relevant item detail information creation processing is processing for creating the relevant item detail information.

Specifically, first, the item identifier included in the relevant item acquisition request received from the relevant item information storage section 136 and the reference item identifier are compared with each other, and all pieces of the relevant item information, which coincide with the reference item identifier, are acquired.

Then, the item information corresponding to the relevant item identifier included in the relevant item information acquired from the item information storage section 132 is acquired, and by using the acquired item information, the relevant item detail information is created.

Note that, in a case where an acquisition restriction number is included in the relevant item acquisition request, in an event of acquiring the relevant item information from the relevant item information storage section 136, the relevant item information just needs to be acquired up to the acquisition restriction number in the descending order of the relevant degrees.

As described above, the relevant item information is created based on the attribute information, whereby it becomes possible to recommend the various items even with the usage information with little amount. Therefore, interest of the user in the recommendation is maintained, and use of the service can be promoted.

The above-mentioned embodiments are exemplification for the description, and the present disclosure is not limited to the above-mentioned embodiments, and is modifiable in various ways within the scope without departing from the spirit of the present invention.

For example, the respective embodiments, modification examples and the like may be combined with one another. Moreover, a partial configuration of the information processing apparatus (information processing server apparatus 1) is provided as a separate body, and a communication is made with such a separated configuration through the network and the like, whereby the functions of the information processing apparatus may be realized.

Moreover, the present disclosure includes a program (information processing program) for allowing a computer to realize the functions of the respective units. The program for these may be read from a recording medium and captured into the computer, or may be transmitted through a communication network and captured into the computer.

The information processing program may be a computer program product stored in a non-transitory computer readable medium.

What is claimed is:

1. An information processing apparatus that provides a terminal device with recommendation information relating to an item to be recommended, comprising:
    a first receiving section configured to receive usage information comprising a usage subject identifier for identifying a usage subject and an item identifier for identifying an item used by the usage subject, the usage subject being the terminal device or a user who uses the terminal device;
    a usage information storage section comprising at least one non-transitory data store, and configured to store a plurality of usage information received by the first receiving section;
    an item information storage section configured to store attribute correspondence information in which the item identifier and an attribute identifier for identifying an attribute of the item are associated with each other;
    an attribute relevant degree calculating section configured to read the usage information stored in the usage information storage section and the attribute correspondence information stored in the item information storage section, to create first and second aggregates, the first aggregate being an aggregate of the usage subject identifier identifying a usage subject that used a predetermined item, the second aggregate being an aggregate of the usage subject identifier identifying a usage subject that used any item corresponding to a predetermined attribute identifier, and to calculate an attribute relevant degree indicating a relevant degree between the item identifier and the attribute identifier based on the first and second aggregates;
    a relevant attribute selection section configured to select two or more attribute identifiers in a descending order of the attribute relevant degree, based on the attribute relevant degree calculated by the attribute relevant degree calculating section, and to create relevant attribute information in which each item identifier and a relevant attribute identifier, which is the selected attribute identifier, are associated with each other, wherein the attribute information comprises an attribute type identifier for uniquely identifying a type of an item attribute and a name of a type of the item attribute associated with other attribute identifier, and resolved in a table format;
    a relevant attribute information storage section comprising at least one non-transitory data store, and configured to store the relevant attribute information created by the relevant attribute selection section;
    a relevant item selection section configured to specify two or more relevant attribute identifiers corresponding to a reference item identifier, the reference item identifier being the item identifier included in the relevant attribute information stored in the relevant attribute information storage section, to specify attribute correspondence information which has an attribute identifier coinciding with the reference item identifier from among the attribute correspondence information stored in the item information storage section, to extract an aggregate of the item identifiers included in the specified attribute correspondence information as an aggregate of relevant candidate items, and to select at least a part of the item identifiers as relevant item identifiers from among the aggregate of relevant candidate items;
    a relevant item information storage section comprising at least one non-transitory data store, and configured to associate the reference item identifier and the relevant item identifiers, and to store the associated identifiers;
    a second receiving section comprising at least one non-transitory data store, and configured to receive a relevant item acquisition request including an item identifier that is a reference of the recommendation information;
    a recommendation information creation section configured to specify a reference item identifier coinciding with the item identifier included in the relevant item acquisition request received by the second receiving section with reference to the relevant item information storage section, and to create the recommendation information relating to the relevant item identifiers corresponding to the specified reference item identifier; and
    a transmitting section configured to transmit the recommendation information created by the recommendation information creation section to the terminal device.

2. The information processing apparatus according to claim 1, wherein
    the relevant item selection section is configured to calculate a relevant degree indicating a degree of relevance between the reference item identifier and each item identifier belonging to the aggregate of relevant candidate items; and
    the relevant item selection section is configured to select the relevant item identifiers from among the aggregate of relevant candidate items, the relevant item identifiers being item identifiers which have a relevant degree equal to or greater than a predetermined degree, or a predetermined number of item identifiers selected in an descending order based on the relevant degree.

3. The information processing apparatus according to claim 2, wherein
    the relevant item selection section is configured to count the number of relevant attribute identifiers which coincide with the attribute identifier corresponding to the item identifier belonging to the aggregate of relevant candidate items from among the relevant attribute identifiers corresponding to the reference item identifier, with reference to the relevant attribute information stored in the relevant attribute information storage section, and the attribute correspondence information stored in the item information storage section; and
    the relevant item selection section is configured to calculate the relevant degree in accordance with the counted number.

4. The information processing apparatus according to claim 2, wherein
    the relevant attribute information storage section is configured to store the relevant attribute information in which the item identifier, the relevant attribute identifier, and the attribute relevant degree are associated with one another;
    the relevant item selection section is configured to specify the relevant attribute identifier corresponding to the item identifier belonging to the aggregate of relevant candidate items, with reference to the relevant attribute information stored in the relevant attribute information storage section, and the attribute correspondence information stored in the item information storage section; and
    the relevant item selection section is configured to calculate the relevant degree in accordance with the attribute relevant degree corresponding to the reference item identifier and the specified relevant attribute identifier.

5. The information processing apparatus according to claim 1, wherein
the attribute relevant degree calculating section is configured to calculate the attribute relevant degree in accordance with the number of the usage subject identifier which is common to the first and second aggregates.

6. The information processing apparatus according to claim 1, wherein
the attribute relevant degree calculating section is configured to create a third aggregate, which is an aggregate of the usage subject identifiers that are common to the first and second aggregates, with reference to the usage information stored in the usage information storage section;
the attribute relevant degree calculating section is configured to calculate a first usage number indicating the number that each usage subject identifier belonging to the third aggregate used the predetermined item;
the attribute relevant degree calculating section is configured to calculate an item preference degree indicating a degree of preference for the predetermined item for each usage subject identifier, based on the first usage number;
the attribute relevant degree calculating section is configured to calculate a second usage number indicating the number that the usage subject identifier belonging to the third aggregate used any item corresponding to the predetermined attribute identifier;
the attribute relevant degree calculating section is configured to calculate an attribute preference degree indicating a degree of preference for the predetermined attribute identifier for each usage subject identifier, based on the second usage number; and
the attribute relevant degree calculating section is configured to calculate the attribute relevant degree by using the item preference degree and the attribute preference degree.

7. The information processing apparatus according to claim 2, further comprising:
an attribute priority value calculation section configured to calculate an attribute priority value indicating a degree of priority for an attribute identifier, based on the attribute correspondence information stored in the item information storage section, the smaller the number of the item identifier for one attribute identifier, the larger the attribute priority value, wherein
the relevant item selection section is configured to calculate the relevant degree in accordance with the attribute priority value calculated by the attribute priority value calculation section.

8. An information processing method of providing a terminal device with recommendation information relating to an item to be recommended, the information processing method comprising:
receiving usage information comprising a usage subject identifier for identifying a usage subject and an item identifier for identifying an item used by the usage subject, the usage subject being the terminal device or a user who uses the terminal device;
storing a plurality of received usage information in a usage information storage section;
storing attribute correspondence information in which the item identifier and an attribute identifier for identifying an attribute of the item are associated with each other in an item information storage section;
reading the usage information stored in the usage information storage section and the attribute correspondence information stored in the item information storage section;
creating first and second aggregates, the first aggregate being an aggregate of the usage subject identifier identifying a usage subject that used a predetermined item, the second aggregate being an aggregate of the usage subject identifier identifying a usage subject that used any item corresponding to a predetermined attribute identifier;
calculating an attribute relevant degree indicating a relevant degree between the item identifier and the attribute identifier based on the first and second aggregates;
selecting two or more attribute identifiers in a descending order of the attribute relevant degree, based on the calculated attribute relevant degree;
creating relevant attribute information in which each item identifier and a relevant attribute identifier which is the selected attribute identifier are associated with each other, wherein the attribute information comprises an attribute type identifier for uniquely identifying a type of an item attribute and a name of a type of the item attribute associated with other attribute identifier, and resolved in a table format;
storing the created relevant attribute information in a relevant attribute information storage section;
specifying two or more relevant attribute identifiers corresponding to a reference item identifier, the reference item identifier being the item identifier included in the relevant attribute information stored in the relevant attribute information storage section;
specifying attribute correspondence information which has an attribute identifier coinciding with the reference item identifier from among the attribute correspondence information stored in the item information storage section;
extracting an aggregate of the item identifiers included in the specified attribute correspondence information as an aggregate of relevant candidate items;
selecting at least a part of the item identifiers as relevant item identifiers from among the aggregate of relevant candidate items;
associating the reference item identifier and the relevant item identifiers, and storing the associated identifiers in a relevant item information storage section;
receiving a relevant item acquisition request including an item identifier that is a reference of the recommendation information;
specifying a reference item identifier coinciding with the item identifier included in the received relevant item acquisition request with reference to the relevant item information storage section;
creating the recommendation information relating to the relevant item identifiers corresponding to the specified reference item identifier; and
transmitting the created recommendation information to the terminal device.

9. A computer program product stored in a non-transitory computer readable medium for causing a computer to execute information processing for providing a terminal device with recommendation information relating to an item to be recommended, the information processing comprising:
a step of receiving usage information comprising a usage subject identifier for identifying a usage subject and an item identifier for identifying an item used by the usage subject, the usage subject being the terminal device or a user who uses the terminal device;

a step of storing a plurality of received usage information in a usage information storage section;

a step of storing attribute correspondence information in which the item identifier and an attribute identifier for identifying an attribute of the item are associated with each other in an item information storage section;

a step of reading the usage information stored in the usage information storage section and the attribute correspondence information stored in the item information storage section;

a step of creating first and second aggregates, the first aggregate being an aggregate of the usage subject identifier identifying a usage subject that used a predetermined item, the second aggregate being an aggregate of the usage subject identifier identifying a usage subject that used any item corresponding to a predetermined attribute identifier;

a step of calculating an attribute relevant degree indicating a relevant degree between the item identifier and the attribute identifier based on the first and second aggregates;

a step of selecting two or more attribute identifiers in a descending order of the attribute relevant degree, based on the calculated attribute relevant degree;

a step of creating relevant attribute information in which each item identifier and a relevant attribute identifier which is the selected attribute identifier are associated with each other, wherein the attribute information comprises an attribute type identifier for uniquely identifying a type of an item attribute and a name of a type of the item attribute associated with other attribute identifier, and resolved in a table format;

a step of storing the created relevant attribute information in a relevant attribute information storage section;

a step of specifying two or more relevant attribute identifiers corresponding to a reference item identifier, the reference item identifier being the item identifier included in the relevant attribute information stored in the relevant attribute information storage section;

a step of specifying attribute correspondence information which has an attribute identifier coinciding with the reference item identifier from among the attribute correspondence information stored in the item information storage section;

a step of extracting an aggregate of the item identifiers included in the specified attribute correspondence information as an aggregate of relevant candidate items;

a step of selecting at least a part of the item identifiers as relevant item identifiers from among the aggregate of relevant candidate items;

a step of associating the reference item identifier and the relevant item identifiers, and storing the associated identifiers in a relevant item information storage section;

a step of receiving a relevant item acquisition request including an item identifier that is a reference of the recommendation information;

a step of specifying a reference item identifier coinciding with the item identifier included in the received relevant item acquisition request with reference to the relevant item information storage section;

a step of creating the recommendation information relating to the relevant item identifiers corresponding to the specified reference item identifier; and a step of transmitting the created recommendation information to the terminal device.

* * * * *